US009096983B1

(12) United States Patent
Mejia

(10) Patent No.: US 9,096,983 B1
(45) Date of Patent: Aug. 4, 2015

(54) DEICING SPRAYER AND IMPACT ABSORBER

(71) Applicant: Ricardo Mejia, Chicago, IL (US)

(72) Inventor: Ricardo Mejia, Chicago, IL (US)

( * ) Notice: Subject to any disclaimer, the term of this patent is extended or adjusted under 35 U.S.C. 154(b) by 0 days.

(21) Appl. No.: 14/490,462

(22) Filed: Sep. 18, 2014

(51) Int. Cl.
*B60B 39/02* (2006.01)
*B60B 39/08* (2006.01)
*E01H 10/00* (2006.01)
*B05B 12/12* (2006.01)

(52) U.S. Cl.
CPC .............. *E01H 10/007* (2013.01); *B05B 12/12* (2013.01)

(58) Field of Classification Search
CPC .... B60B 39/02; B60B 39/021; B60B 39/022; B60B 39/08; B60B 39/10; B60B 39/027; B60B 39/04; B60B 39/06; B60B 39/083; B60B 39/025
See application file for complete search history.

(56) References Cited

U.S. PATENT DOCUMENTS

| | | | | | |
|---|---|---|---|---|---|
| 3,336,064 | A | * | 8/1967 | Dzaack | 291/1 |
| 3,827,736 | A | * | 8/1974 | Mango | 291/20 |
| 4,203,423 | A | * | 5/1980 | Ricci | 126/271.1 |
| 4,316,625 | A | * | 2/1982 | Goon et al. | 291/1 |
| 4,848,510 | A | * | 7/1989 | Ahmed | 180/309 |
| 5,100,175 | A | * | 3/1992 | Swallow et al. | 280/757 |
| 5,350,035 | A | * | 9/1994 | Bodier et al. | 180/271 |
| 5,582,441 | A | * | 12/1996 | Frost | 291/2 |
| 6,371,532 | B1 | * | 4/2002 | Skarie et al. | 291/38 |
| 6,488,217 | B1 | * | 12/2002 | Donastorg | 239/131 |
| 6,848,726 | B1 | * | 2/2005 | Horsham | 291/3 |
| 6,946,621 | B1 | * | 9/2005 | Roseman | 219/202 |
| 7,575,258 | B1 | * | 8/2009 | Osei-Bosompem | 291/2 |
| 7,976,076 | B1 | * | 7/2011 | Ahern | 291/38 |
| 8,371,625 | B2 | * | 2/2013 | Crawford, Sr. | 291/2 |
| 8,465,061 | B1 | * | 6/2013 | Reid | 291/38 |
| 2004/0070265 | A1 | * | 4/2004 | Sakai et al. | 303/1 |
| 2006/0060441 | A1 | * | 3/2006 | Sakai et al. | 191/2 |
| 2014/0081515 | A1 | * | 3/2014 | Goulet | 701/36 |

* cited by examiner

*Primary Examiner* — Jason C Smith
(74) *Attorney, Agent, or Firm* — Crossley Patent Law

(57) ABSTRACT

A deicing sprayer and impact absorber including fluid holding bumper tanks disposed upon a front and rear bumper a vehicle. The bumper tanks are filled with a deicing fluid and are configured to disperse the force of a collision upon the bumper portion of the vehicle. A reserve tank is disposed underneath one of the vehicles seats and is also filled with deicing fluid. A pump having a plurality of conduits in operational communication with each of the bumper tanks, the reserve tank, and a plurality of dispenser nozzles. A power switch and a CPU are disposed upon the vehicle and are in operational communication and in circuit with each of the pump and the vehicle battery. A plurality of automatic sensors configured to obtain humidity and temperature measurements are disposed on the undercarriage of the vehicle and are in operational communication with the CPU.

9 Claims, 6 Drawing Sheets

DEICING SPRAYER AND IMPACT ABSORBER

BACKGROUND OF THE INVENTION

Various types of deicing sprayer devices for vehicles are known in the prior art. These devices spray a deicing fluid onto or around a vehicle's wheels to prevent ice accumulation on the wheels and to provide better traction. However, many of these devices require manual operation of the deicing sprayer. This can often be dangerous for the user, as operating the deicing sprayer can distract the user while driving the automobile. Additionally, these sprayers are often contained in one unit, such that the pump, the reservoir, and the sprayer nozzles are fully integrated. Thus, if one component of the sprayer is damaged or rendered non-functional, the entire apparatus is rendered non-functional. Further, many of these known deicing sprayers are merely strapped onto the chassis of an automobile near each vehicle wheel. Therefore, they fail to serve any other function other than as a deicing sprayer.

Thus, what is needed is a deicing sprayer and impact absorber apparatus and method for mounting the apparatus to an existing vehicle. The present deicing sprayer and impact absorber apparatus includes at least two fluid holding bumper tanks disposed upon a front and rear bumper a vehicle. The bumper tanks are filled with a deicing fluid and are configured to absorb and disperse the force of a collision upon the bumper portion of the vehicle, thus greatly improving the vehicle occupant's safety. A reserve tank is disposed underneath one of the vehicles seats and is also filled with deicing fluid. A pump having a plurality of conduits is disposed on the vehicle. The conduits are in operational communication with each of the bumper tanks, the reserve tank, and a plurality of dispenser nozzles. A power switch and a CPU are disposed upon the vehicle and are in operational communication and in circuit with each of the pump and the vehicle battery. A user may actuate the pumps by activating the power switch. A plurality of automatic sensors configured to obtain humidity and temperature measurements are disposed on the undercarriage of the vehicle and are in operational communication with the CPU. The CPU will actuate the pump when the humidity and temperature measurements are within a predetermined set of parameter stored on the CPU.

Thus, the present deicing sprayer and impact absorber has many improvements over the prior art including, but not limited to, absorbing and dispersing the force of a collision upon the bumper portion of the vehicle, utilizing automatic sensors to actuate the pump, and decreasing the cost of repair should one element of the apparatus fail. Additionally, the present invention will retain partial functionality as an impact absorber should any one of the CPU, automatic sensors, pump, reserve tank, or vehicle battery fail.

FIELD OF THE INVENTION

The present invention relates to deicing sprayer, and more particularly, to a deicing sprayer and impact absorber.

SUMMARY OF THE INVENTION

The general purpose of the present deicing sprayer and impact absorber, described subsequently in greater detail, is to provide a deicing sprayer and impact absorber which has many novel features that result in a deicing sprayer and impact absorber which is not anticipated, rendered obvious, suggested, or even implied by prior art, either alone or in combination thereof.

The deicing sprayer and impact absorber apparatus for mounting to an existing vehicle includes at least two fluid holding bumper tanks. At least one of the fluid holding bumper tanks is disposed upon a front bumper of the existing vehicle. Another of the fluid holding bumper tanks is disposed upon a rear bumper of the existing vehicle. Each of the fluid holding bumper tanks is configured to store a deicer fluid. The fluid holding bumper tanks are also configured to decrease the impact of a collision upon the front bumper and the rear bumper of the existing vehicle. The fluid holding bumper tanks are configured to absorb and disperse the force of the collision wherein the impact of the collision is significantly cushioned. Thus, the positioning and configuration of the fluid holding bumper tanks is critical to the function of the apparatus.

A pump is disposed upon the existing vehicle. The pump has a plurality of conduits extending therefrom. The conduits are in operational communication with each of the fluid holding bumper tanks and a plurality of dispenser nozzles. The pump is configured to siphon the deicer fluid from each of the fluid holding bumper tanks and propel the deicer fluid to each of the dispenser nozzles. The pump and the fluid holding bumper tanks can be disposed upon the existing vehicle in different areas, so that if damage is caused to one area of the vehicle, such as the front or rear bumpers, and the bumper fluid holding tanks were to damaged, the pump would remain undamaged. Thus, this configuration renders repair of the apparatus less expensive, as the user would only have to replace the damaged element and not the entire apparatus.

At least one of the dispenser nozzles is disposed within each of a respective wheel well of the existing vehicle. The dispenser nozzles are configured to dispense the deicer fluid proximal a wheel of the existing vehicle. The dispenser nozzles are configured to dispense the deicer fluid onto a road surrounding the wheel, as well as directly onto the wheel.

A power switch is disposed upon a steering wheel of the existing vehicle. The power switch is in operational communication with a CPU. The CPU is also disposed upon the existing vehicle. The power switch is configured to send an electrical signal to the CPU, and the CPU is configured to actuate the pump upon receipt of the electrical signal from the power switch.

A plurality of automatic sensors are disposed on an undercarriage of the existing vehicle. The automatic sensors are in operational communication with the CPU and are configured to obtain humidity and temperature measurements of an environment. The automatic sensors are further configured to send the humidity and temperature measurements to the CPU. The CPU is configured to receive and process the humidity and temperature measurements from the automatic sensors. The CPU is also configured to actuate the pump when the humidity and temperature measurements are within a predetermined set of parameters stored on the CPU. A vehicle battery of the existing vehicle is in circuit with each of the CPU, the pump, the power switch, and the plurality of automatic sensors.

At least one fluid holding reserve tank is disposed below a respective seat of the existing vehicle. The fluid holding reserve tank is configured to store the deicer fluid. Each of the at least one fluid holding reserve tanks is in operational communication with at least one of the conduits. The pump is configured to siphon the deicer fluid from each of the at least one fluid holding reserve tank and propel the deicer fluid to each of the dispenser nozzles.

It is envisioned that the apparatus described above is compatible with a variety of vehicle frames, such as those of cars, trucks, vans campers, RV's, and SUV's. For instance, FIGS.

2-4 illustrates the deicing sprayer and impact absorber apparatus disposed upon car. FIG. 5 illustrates the deicing sprayer and impact absorber disposed upon a commercial semi-trailer truck.

An additional aspect of the invention involves a method of mounting the deicing sprayer and impact absorber to the existing vehicle. The method includes installing a plurality of fluid holding bumper tanks onto the existing vehicle; disposing at least one of the fluid holding bumper tanks upon a front bumper of the existing vehicle; disposing at least one of the fluid holding bumper tanks upon a rear bumper of the existing vehicle, filling each of the fluid holding bumper tanks with a deicer fluid; installing a plurality of dispenser nozzles upon the existing vehicle; positioning the dispenser nozzles near a wheel well of the existing vehicle; installing a pump onto the existing vehicle; installing a plurality of conduits onto the pump; installing at least one fluid holding reserve tank upon the existing vehicle, filling the fluid holding reserve tank with deicer fluid; placing the conduits in operational communication with each of the fluid holding bumper tanks, the fluid holding reserve tank, and the plurality of dispenser nozzles; installing a power switch upon a steering wheel of the existing vehicle; installing a CPU upon the existing vehicle; installing a plurality of automatic sensors upon an undercarriage of the existing vehicle, the automatic sensors configured to obtain and send humidity and temperature measurements to the CPU; placing a vehicle battery of the existing vehicle in circuit with each of the CPU, the pump, the power switch, and the plurality of automatic sensors; and placing the power switch, the automatic sensors, and the pump in operational communication with the CPU.

Thus has been broadly outlined the more important features of the present deicing sprayer and impact absorber so that the detailed description thereof that follows may be better understood and in order that the present contribution to the art may be better appreciated.

Numerous objects, features and advantages of the present deicing sprayer and impact absorber will be readily apparent to those of ordinary skill in the art upon reading the following detailed description of presently preferred, but nonetheless illustrative, examples of the present deicing sprayer and impact absorber when taken in conjunction with the accompanying drawings.

BRIEF DESCRIPTION OF THE DRAWINGS

Figures

DETAILED DESCRIPTION OF THE DRAWINGS

Figure 1:
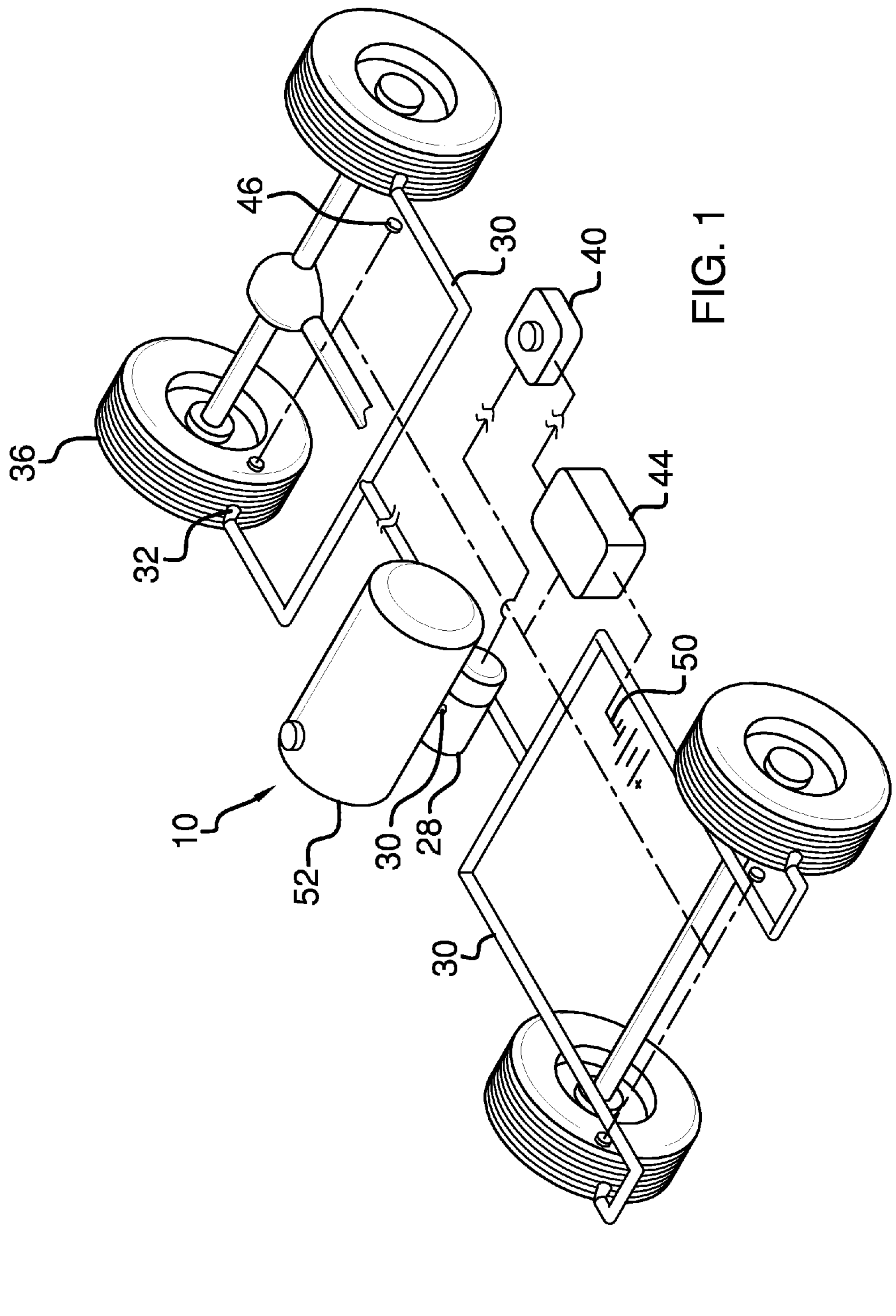
FIG. 1 is an exploded isometric view.

With reference now to the drawings, and in particular FIGS. 1 through 6 thereof, the instant deicing sprayer and impact absorber employing the principles and concepts of the present deicing sprayer and impact absorber and generally designated by the reference number 10 will be described.

Referring to FIGS. 1 through 6 a preferred embodiment of the present deicing sprayer and impact absorber 10 is illustrated. The deicing sprayer and impact absorber apparatus 10 for mounting to an existing vehicle 12 includes at least two fluid holding bumper tanks 20. At least one of the fluid holding bumper tanks 20 is disposed upon a front bumper 22 of the existing vehicle 12. Another of the fluid holding bumper tanks 20 is disposed upon a rear bumper 24 of the existing vehicle 12. Each of the fluid holding bumper tanks 20 is configured to store a deicer fluid 26. The fluid holding bumper tanks 20 are also configured to decrease the impact of a collision upon the front bumper 22 and the rear bumper 24 of the existing vehicle 12. The fluid holding bumper tanks 20 are configured to absorb and disperse the force of the collision wherein the impact of the collision is significantly cushioned. Thus, the positioning and configuration of the fluid holding bumper tanks is critical to the function of the apparatus.

A pump 28 is disposed upon the existing vehicle 20. The pump 28 has a plurality of conduits 30 extending therefrom. The conduits 30 are in operational communication with each of the fluid holding bumper tanks 20 and a plurality of dispenser nozzles 32. The pump 28 is configured to siphon the deicer fluid 26 from each of the fluid holding bumper tanks 20 and propel the deicer fluid 26 to each of the dispenser nozzles 32.

At least one of the dispenser nozzles 32 is disposed within each of a respective wheel well 34 of the existing vehicle 20. The dispenser nozzles 32 are configured to dispense the deicer fluid 26 proximal a wheel 36 of the existing vehicle 20. The dispenser nozzles 32 are configured to dispense the deicer fluid 26 onto a road 38 surrounding the wheel 36, as well as directly onto the wheel 36.

A power switch 40 is disposed upon a steering wheel 42 of the existing vehicle 12. The power switch 40 is in operational communication with a CPU 44. The CPU 44 is also disposed upon the existing vehicle 20. The power switch 40 is configured to send an electrical signal to the CPU 44, and the CPU 44 is configured to actuate the pump 28 upon receipt of the electrical signal from the power switch 40.

A plurality of automatic sensors 46 are disposed on an undercarriage 48 of the existing vehicle 20. The automatic sensors 46 are in operational communication with the CPU 44 and are configured to obtain humidity and temperature measurements of an environment. The automatic sensors 46 are further configured to send the humidity and temperature measurements to the CPU 44. The CPU 44 is configured to receive and process the humidity and temperature measurements from the automatic sensors 46. The CPU 44 is also configured to actuate the pump 28 when the humidity and temperature measurements are within a predetermined set of parameters stored on the CPU 44. A vehicle battery 50 of the existing vehicle 20 is in circuit with each of the CPU 44, the pump 28, the power switch 40, and the plurality of automatic sensors 46.

At least one fluid holding reserve tank 52 is disposed below a respective seat 54 of the existing vehicle 20. The fluid holding reserve tank 52 is configured to store the deicer fluid 26. Each of the at least one fluid holding reserve tanks 52 is in operational communication with at least one of the conduits 30. The pump 28 is configured to siphon the deicer fluid 26 from each of the at least one fluid holding reserve tank 52 and propel the deicer fluid 26 to each of the dispenser nozzles 32.

Figure 2:
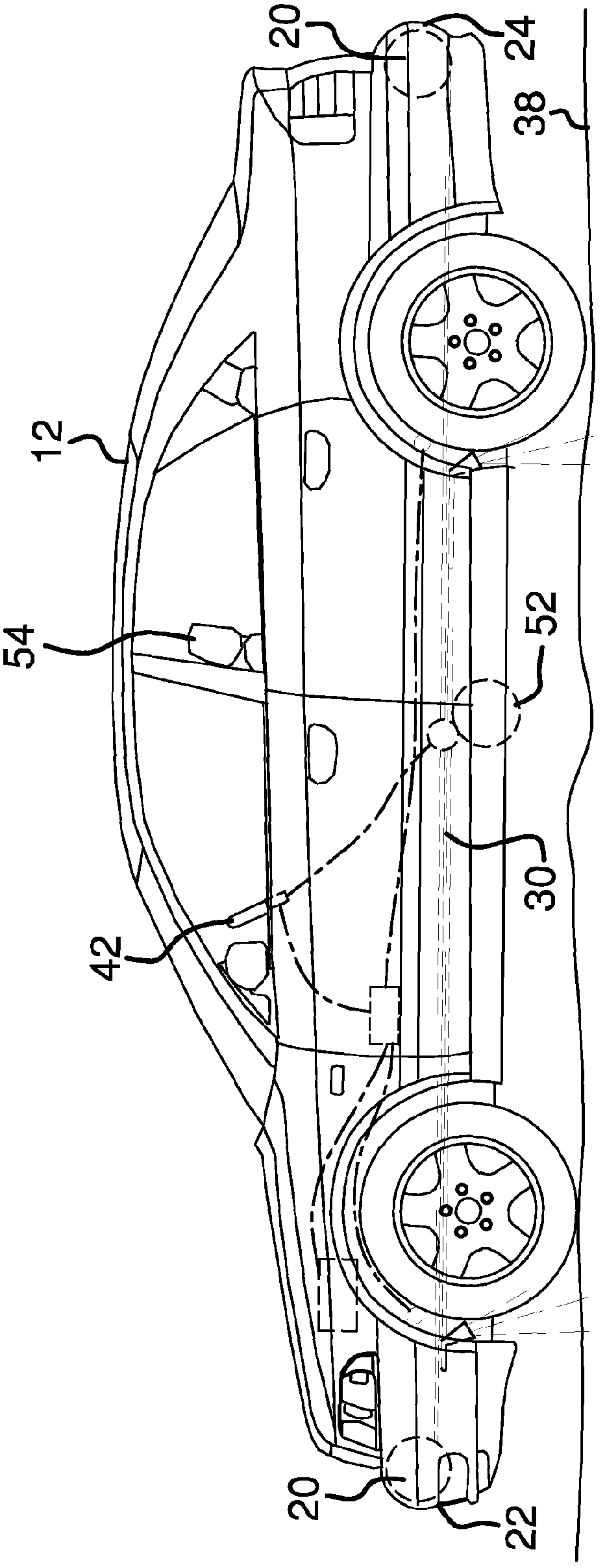
FIG. 2 is a side view of the apparatus installed on a car.
Figure 3:
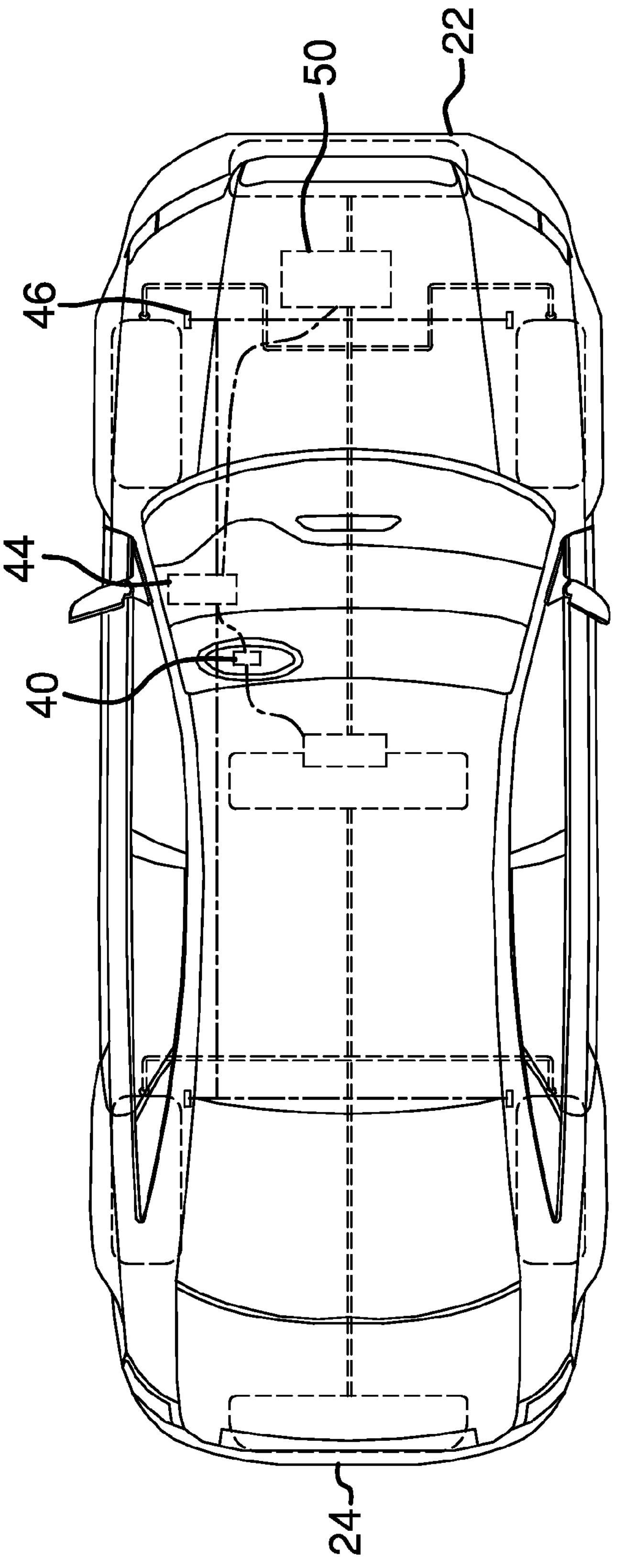
FIG. 3 is a top view of the apparatus installed on a car.
Figure 4:
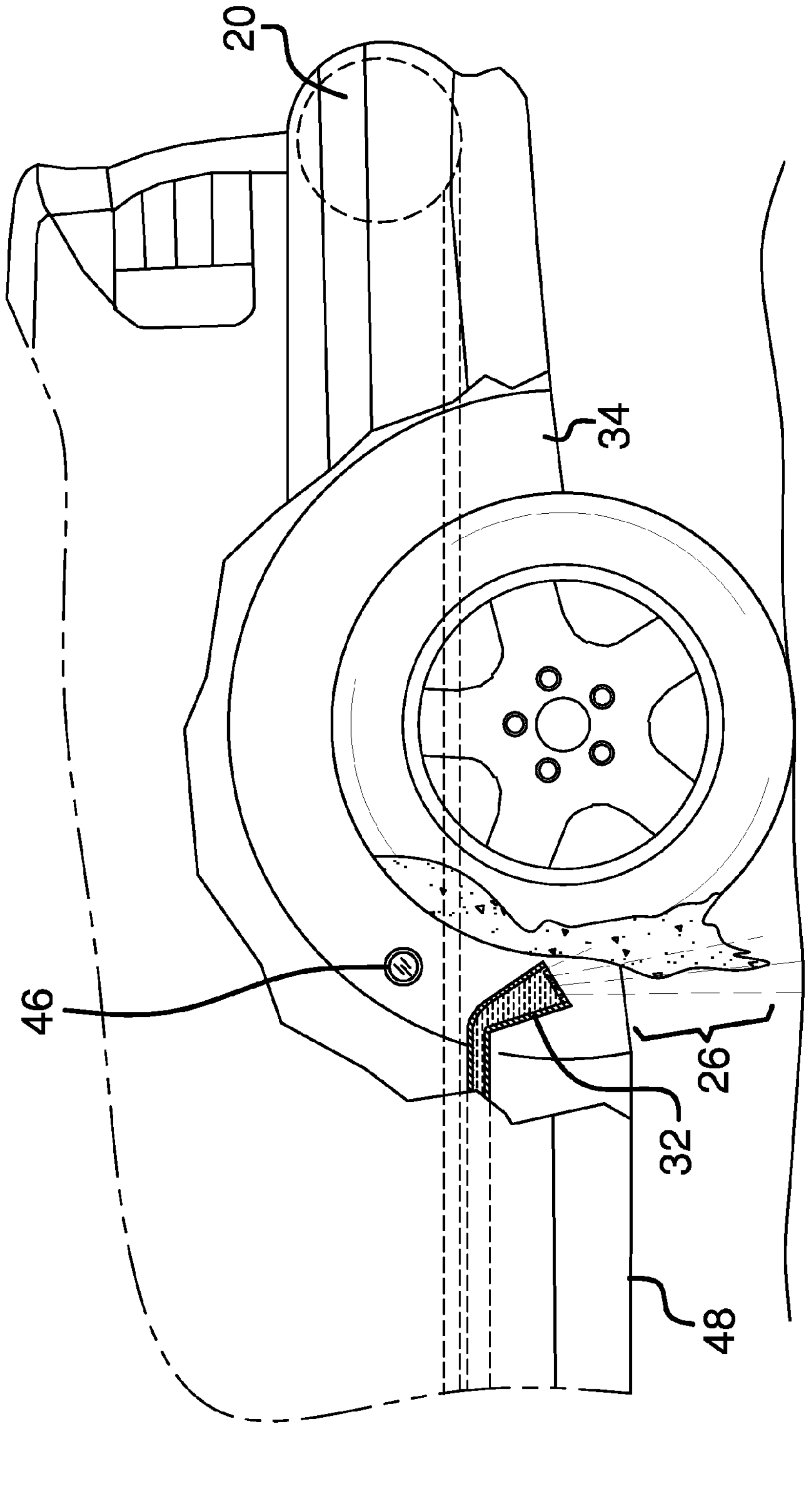
FIG. 4 is a partial cross-sectional view of the apparatus installed on a car.
Figure 5:
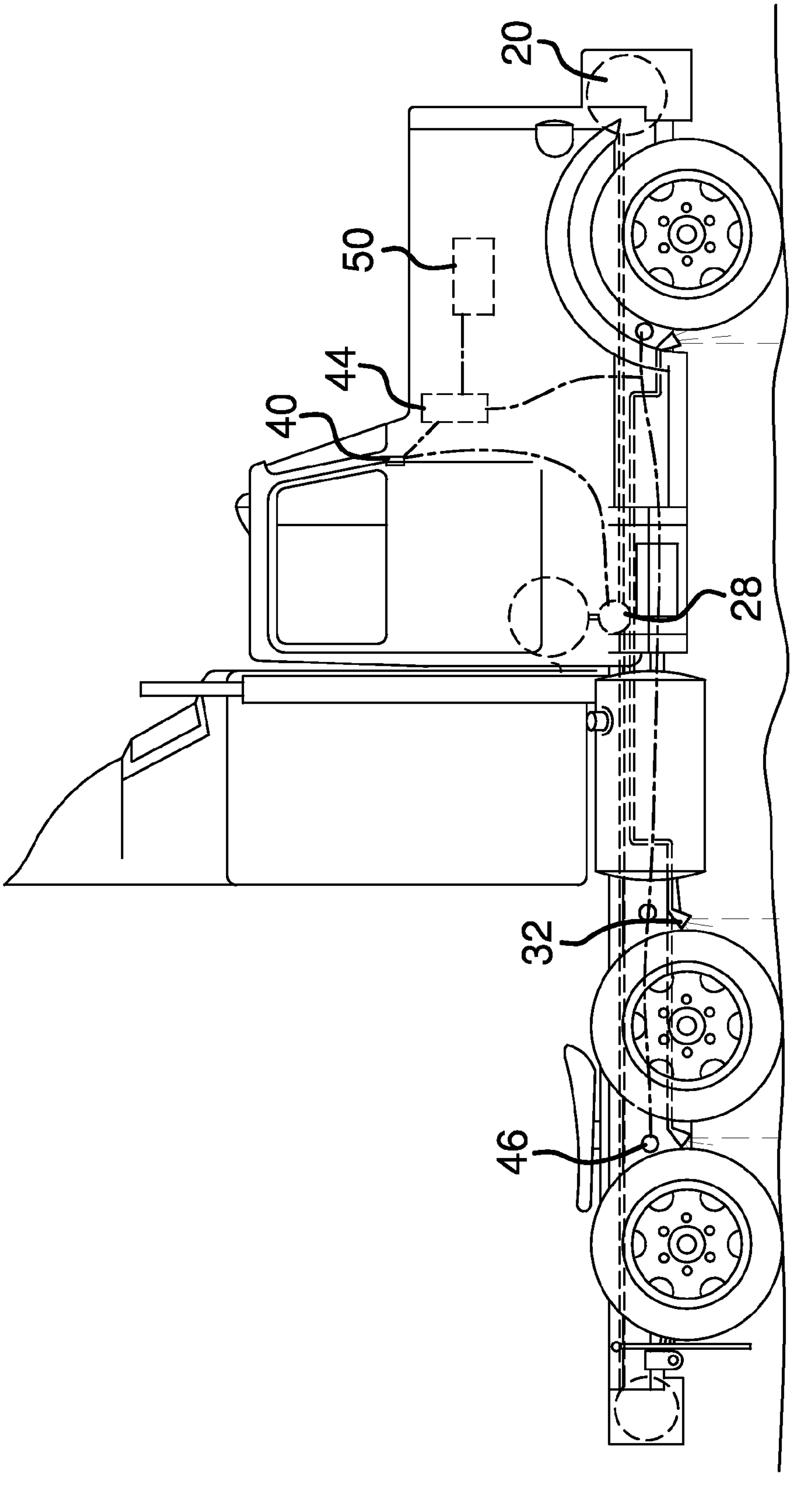
FIG. 5 is a side view of the apparatus installed on a semi-truck.
Figure 6:
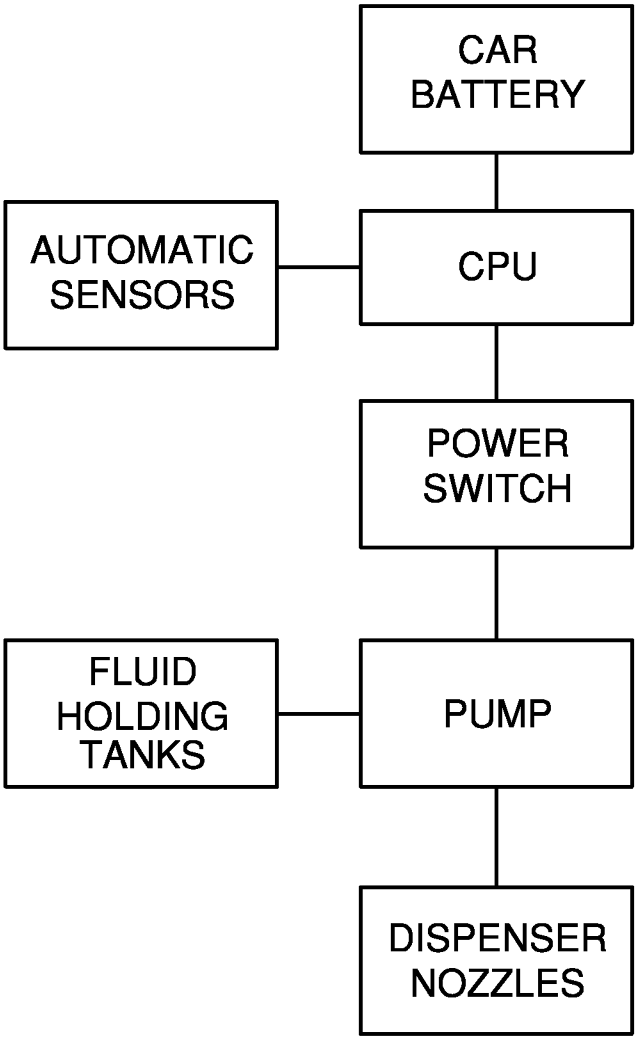
FIG. 6 is a block diagram.

It is envisioned that the apparatus described above is compatible with a variety of vehicle frames, such as those of cars, trucks, vans campers, RV's, SUV's. For instance, FIGS. 2-4 illustrates the deicing sprayer and impact absorber apparatus disposed upon car. FIG. 5 illustrates the deicing sprayer and impact absorber disposed upon a commercial semi-trailer truck.

What is claimed is:

1. A deicing sprayer and impact absorber apparatus for mounting to an existing vehicle comprising:

at least two fluid holding bumper tanks, at least one of the fluid holding bumper tanks disposed upon a front bumper of the existing vehicle, another of the at least two fluid holding bumper tanks disposed upon a rear bumper of the existing vehicle, wherein each of the fluid holding bumper tanks is configured to store a deicer fluid, each of the fluid holding bumper tanks configured to absorb and disperse the force of a collision while decreasing the impact upon a bumper portion of the existing vehicle;

a pump disposed upon the existing vehicle, the pump having a plurality of conduits extending therefrom, the conduits in operational communication with each of the fluid holding bumper tanks and a plurality of dispenser nozzles, the pump configured to siphon the deicer fluid from each of the fluid holding bumper tanks and propel the deicer fluid to each of the dispenser nozzles;

at least one of the dispenser nozzles disposed within each of a respective wheel well of the existing vehicle, wherein the dispenser nozzles are configured to dispense the deicer fluid proximal a wheel of the existing vehicle;

a power switch disposed proximal a driver's seat of the existing vehicle, the power switch in operational communication with a CPU, the CPU disposed upon the existing vehicle, the power switch configured to send an electrical signal to the CPU, the CPU configured to actuate the pump upon receipt of the electrical signal from the power switch; and a power source in circuit with each of the CPU, the pump, and the power switch.

2. The deicing sprayer and impact absorber apparatus of claim 1 further comprising:

a plurality of automatic sensors disposed on the existing vehicle, the automatic sensors in operational communication with the CPU, the automatic sensors configured to obtain humidity and temperature measurements of an environment, the automatic sensors further configured to send the humidity and temperature measurements to the CPU; and the CPU configured to receive and process the humidity and temperature measurements from the automatic sensors, the CPU configured to actuate the pump when the humidity and temperature measurements are within a predetermined set of parameters stored on the CPU.

3. The deicing sprayer and impact absorber apparatus of claim 2 further comprising:

at least one fluid holding reserve tank, each of the at least one fluid holding reserve tank disposed below a respective seat of the existing vehicle, the fluid holding reserve tank configured to store the deicer fluid; and the conduits in operational communication with each of the at least one fluid holding reserve tank, the pump configured to siphon the deicer fluid from each of the at least one fluid holding reserve tank and propel the deicer fluid to each of the dispenser nozzles.

4. The deicing sprayer and impact absorber apparatus of claim 3 wherein the power source is a vehicle battery of the existing vehicle.

5. The deicing sprayer and impact absorber apparatus of claim 4 wherein the automatic sensors are disposed on an undercarriage of the existing vehicle.

6. The deicing sprayer and impact absorber apparatus of claim 5 wherein at least one of the automatic sensors is disposed within each respective wheel well of the existing vehicle.

7. The deicing sprayer and impact absorber apparatus of claim 6 wherein the power switch is disposed upon a steering wheel of the existing vehicle.

8. A deicing sprayer and impact absorber apparatus for mounting to an existing vehicle comprising:

at least two fluid holding bumper tanks, at least one of the fluid holding bumper tanks disposed upon a front bumper of the existing vehicle, another of the at least two fluid holding bumper tanks disposed upon a rear bumper of the existing vehicle, wherein each of the fluid holding bumper tanks is configured to store a deicer fluid, each of the fluid holding bumper tanks configured to absorb and disperse the force of a collision while decreasing the impact upon a bumper portion of the existing vehicle;

a pump disposed upon the existing vehicle, the pump having a plurality of conduits extending therefrom, the conduits in operational communication with each of the fluid holding bumper tanks and a plurality of dispenser nozzles, the pump configured to siphon the deicer fluid from each of the fluid holding bumper tanks and propel the deicer fluid to each of the dispenser nozzles;

at least one of the dispenser nozzles disposed within each of a respective wheel well of the existing vehicle, wherein the dispenser nozzles are configured to dispense the deicer fluid proximal a wheel of the existing vehicle;

a power switch disposed upon a steering wheel of the existing vehicle, the power switch in operational communication with a CPU, the CPU disposed upon the existing vehicle, the power switch configured to send an electrical signal to the CPU, the CPU configured to actuate the pump upon receipt of the electrical signal from the power switch;

a plurality of automatic sensors disposed on an undercarriage of the existing vehicle, the automatic sensors in operational communication with the CPU, the automatic sensors configured to obtain humidity and temperature measurements of an environment, the automatic sensors further configured to send the humidity and temperature measurements to the CPU;

the CPU configured to receive and process the humidity and temperature measurements from the automatic sensors, the CPU configured to actuate the pump when the humidity and temperature measurements are within a predetermined set of parameters stored on the CPU;

a vehicle battery of the existing vehicle, the vehicle battery in circuit with each of the CPU, the pump, the power switch, and the plurality of automatic sensors;

at least one fluid holding reserve tank, each of the at least one fluid holding reserve tank disposed below a seat of the existing vehicle, the fluid holding reserve tank configured to store the deicer fluid; and the conduits in operational communication with each of the at least one fluid holding reserve tank, the pump configured to siphon the deicer fluid from each of the at least one fluid holding reserve tank and propel the deicer fluid to each of the dispenser nozzles.

9. A method of mounting a deicing sprayer and impact absorber to an existing vehicle comprising:

installing a plurality of fluid holding bumper tanks onto the existing vehicle;

disposing at least one of the fluid holding bumper tanks configured to absorb and disperse the force of a collision upon a front bumper of the existing vehicle;

disposing at least one of the fluid holding bumper tanks configured to absorb and disperse the force of a collision upon a rear bumper of the existing vehicle, filling each of the fluid holding bumper tanks with a deicer fluid;

installing a plurality of dispenser nozzles upon the existing vehicle;

positioning the dispenser nozzles near a wheel well of the existing vehicle;

installing a pump onto the existing vehicle;

installing a plurality of conduits onto the pump;

installing at least one fluid holding reserve tank upon the existing vehicle, filling the fluid holding reserve tank with deicer fluid;

placing the conduits in operational communication with each of the fluid holding bumper tanks, the fluid holding reserve tank, and the plurality of dispenser nozzles;

installing a power switch upon a steering wheel of the existing vehicle;

installing a CPU upon the existing vehicle;

installing a plurality of automatic sensors upon an undercarriage of the existing vehicle, the automatic sensors configured to obtain and send humidity and temperature measurements to the CPU;

placing a vehicle battery of the existing vehicle in circuit with each of the CPU, the pump, the power switch, and the plurality of automatic sensors; and placing the power switch, the automatic sensors, and the pump in operational communication with the CPU.

* * * * *